US012394272B2

(12) United States Patent
Perrow et al.

(10) Patent No.: US 12,394,272 B2
(45) Date of Patent: Aug. 19, 2025

(54) GAMING SYSTEM WITH WIRELESS CHARGING SYSTEM AND METHOD OF DETERMINING WIRELESS CHARGING STATUS THEREOF

(71) Applicant: Aristocrat Technologies Australia Pty Limited, North Ryde (AU)

(72) Inventors: Shane Perrow, Kembla Heights (AU); Myron Dennison, Lane Cove (AU); David Thompson, Narrabeen (AU)

(73) Assignee: Aristocrat Technologies Australia Pty Ltd., North Ryde (AU)

( * ) Notice: Subject to any disclaimer, the term of this patent is extended or adjusted under 35 U.S.C. 154(b) by 0 days.

(21) Appl. No.: 18/753,910

(22) Filed: Jun. 25, 2024

(65) Prior Publication Data

US 2024/0346874 A1 Oct. 17, 2024

Related U.S. Application Data

(60) Division of application No. 17/805,562, filed on Jun. 6, 2022, now Pat. No. 12,051,296, which is a (Continued)

(30) Foreign Application Priority Data

Oct. 11, 2018 (AU) .................. 2018247282

(51) Int. Cl.
*G07F 17/00* (2006.01)
*G07F 17/32* (2006.01)
(Continued)

(52) U.S. Cl.
CPC ...... *G07F 17/3209* (2013.01); *G07F 17/3211* (2013.01); *G07F 17/3223* (2013.01);
(Continued)

(58) Field of Classification Search
None
See application file for complete search history.

(56) References Cited

U.S. PATENT DOCUMENTS 6,057,668 A 5/2000 Chao
8,004,235 B2 8/2011 Baarman
(Continued)

OTHER PUBLICATIONS

Xiang Gao, "Demodulating Communication Signals of Qi-Compliant Low-Power Wireless Charger Using MC56F8006 DSC," copyrighted by Freescale Semiconductor Inc. in 2013, downloaded from Internet on Sep. 16, 2019 (https://www.nxp.com/docs/en/application-note/AN4701.pdf).

(Continued)

*Primary Examiner* — Paul A D'Agostino
(74) *Attorney, Agent, or Firm* — Weaver Austin Villeneuve and Sampson LLP

(57) ABSTRACT

Disclosed herein are an electronic gaming system with a wireless charger for providing wireless charging of a user's wirelessly chargeable device(s). The electronic gaming system may include a wireless charging status determination system that may measure an aspect of power supplied to the wireless charger by the electronic gaming system and may determine a charging status of the wireless charger from such measurements, thereby allowing determination of charging status of the wireless charger (and, correspondingly, a determination of charge status for a wirelessly chargeable device being charged by wireless charger) by the wireless charging status determination system without requiring any data communication between itself and the wireless charger and/or the wirelessly chargeable device. This may allow the wireless charging status determination system to communicate charging status information with, for example, the electronic gaming system without exposing (Continued)

the electronic gaming system to potential malicious interference from the wirelessly chargeable device.

20 Claims, 8 Drawing Sheets

Related U.S. Application Data continuation of application No. 16/590,247, filed on Oct. 1, 2019, now Pat. No. 11,355,949.

(51) Int. Cl.
  *H02J 50/12* (2016.01)
  *H02J 50/90* (2016.01)
  *G07F 17/34* (2006.01)

(52) U.S. Cl.
  CPC .......... *G07F 17/3244* (2013.01); *H02J 50/12* (2016.02); *H02J 50/90* (2016.02); *G07F 17/3213* (2013.01); *G07F 17/329* (2013.01); *G07F 17/3293* (2013.01); *G07F 17/34* (2013.01)

(56) References Cited

U.S. PATENT DOCUMENTS

| | | | | |
|---|---|---|---|---|
| 8,956,222 B2* | 2/2015 | LeMay | ............... | G07F 17/32 463/16 |
| 9,837,823 B2* | 12/2017 | Thorsoe | ............... | H02J 4/00 |
| 9,867,062 B1 | 1/2018 | Bell | | |
| 11,664,686 B2* | 5/2023 | Sun | ............... | H04M 1/04 307/31 |
| 11,722,009 B2* | 8/2023 | Sepahvand | ............... | H02J 7/342 320/108 |
| 11,936,225 B2* | 3/2024 | Garbus | ............... | H02J 7/0048 |
| 12,051,296 B2* | 7/2024 | Perrow | ............... | G07F 17/3211 |
| 12,079,532 B2* | 9/2024 | Behzadi | ............... | G06F 3/0484 |
| 2010/0259217 A1* | 10/2010 | Baarman | ............... | H02J 50/80 320/108 |
| 2012/0169133 A1 | 7/2012 | Lisi | | |
| 2013/0053136 A1 | 2/2013 | Lemay | | |
| 2013/0082662 A1* | 4/2013 | Carre | ............... | H02J 7/0068 320/134 |
| 2013/0099585 A1* | 4/2013 | Von Novak | ............... | H02J 50/90 307/104 |
| 2013/0165208 A1 | 6/2013 | Nelson | | |
| 2013/0225077 A1* | 8/2013 | Schultz | ............... | H04B 5/79 455/41.1 |
| 2013/0300204 A1 | 11/2013 | Partovi | | |
| 2014/0015327 A1* | 1/2014 | Keeling | ............... | B60L 58/12 307/104 |
| 2014/0203770 A1 | 7/2014 | Salter | | |
| 2014/0265610 A1* | 9/2014 | Bakker | ............... | H02J 50/12 307/104 |
| 2014/0266025 A1 | 9/2014 | Jakubowski | | |
| 2014/0293538 A1* | 10/2014 | Han | ............... | H05K 7/20145 361/690 |
| 2015/0054458 A1* | 2/2015 | Yoon | ............... | H02J 50/12 320/108 |
| 2015/0077046 A1* | 3/2015 | Huang | ............... | B60L 53/38 320/108 |
| 2015/0084584 A1 | 3/2015 | Monks | | |
| 2015/0270734 A1* | 9/2015 | Davison | ............... | H04B 1/3888 320/103 |
| 2015/0380978 A1* | 12/2015 | Toivola | ............... | H02J 7/04 320/108 |
| 2016/0050563 A1* | 2/2016 | Bronk | ............... | H04L 63/062 726/7 |
| 2016/0180656 A1* | 6/2016 | Loose | ............... | G07F 17/3209 463/20 |
| 2016/0233716 A1* | 8/2016 | Lee | ............... | H04W 8/005 |
| 2016/0241087 A1* | 8/2016 | Bae | ............... | H02J 50/12 |
| 2016/0322847 A1* | 11/2016 | Geiszler | ............... | H02J 50/10 |
| 2016/0329752 A1* | 11/2016 | Bae | ............... | H02J 7/00034 |
| 2016/0379496 A1 | 12/2016 | Cho | | |
| 2017/0105131 A1* | 4/2017 | Song | ............... | H04W 4/80 |
| 2017/0237277 A1* | 8/2017 | Onishi | ............... | H02J 7/04 307/23 |
| 2017/0331335 A1* | 11/2017 | Brooks | ............... | H02J 50/60 |
| 2017/0338696 A1* | 11/2017 | Bae | ............... | H02J 50/12 |
| 2019/0363590 A1 | 11/2019 | Jakubowski | | |
| 2021/0295648 A1 | 9/2021 | Lutnick | | |

OTHER PUBLICATIONS

"Qi Wireless Charging Standard—details and specifics about the Qi Wireless Charging Standard developed and promoted by the Wireless Power Consortium", downloaded from Internet on Sep. 23, 2019, at https://www.electronics-notes.com/articles/equipment-items-gadgets/wireless-battery-charging/qi-wireless-charging-standard.php (no longer valid). Publication date unknown.
Office Action (Non-Final Rejection) dated Sep. 30, 2021 for U.S. Appl. No. 16/590,247 (pp. 1-4).
Office Action (Notice of Allowance and Fees Due (PTOL-85)) dated Feb. 2, 2022 for U.S. Appl. No. 16/590,247 (pp. 1-5).
Office Action (Notice of Allowance and Fees Due (PTOL-85)) dated Apr. 29, 2022 for U.S. Appl. No. 16/590,247 (pp. 1-2).
Office Action (Non-Final Rejection) dated Mar. 8, 2024 for U.S. Appl. No. 17/805,562 (pp. 1-16).
Office Action (Notice of Allowance and Fees Due (PTOL-85)) dated Apr. 30, 2024 for U.S. Appl. No. 17/805,562 (pp. 1-7).
Australian Examination Report No. 1 issued in App. No. AU2018247282, dated Jul. 18, 2024, 3 pages.

\* cited by examiner

GAMING SYSTEM WITH WIRELESS CHARGING SYSTEM AND METHOD OF DETERMINING WIRELESS CHARGING STATUS THEREOF

RELATED APPLICATION(S)

The present application is divisional of U.S. patent application Ser. No. 17/805,562, filed Jun. 6, 2022, and titled "GAMING SYSTEM WITH WIRELESS CHARGING SYSTEM AND METHOD OF DETERMINING WIRELESS CHARGING STATUS THEREOF," which itself is a continuation of U.S. patent application Ser. No. 16/590,247, filed Oct. 1, 2019, and titled "GAMING SYSTEM WITH WIRELESS CHARGING SYSTEM AND METHOD OF DETERMINING WIRELESS CHARGING STATUS THEREOF," which itself claims benefit of priority to Australian Patent Application No. 2018247282, filed Oct. 11, 2018, and entitled "System and method of determining wireless charging status," all of which are hereby incorporated by reference herein in their entireties.

FIELD

The present disclosure relates to determining the charging status of a wireless charger, thus allowing a determination of the charge status of a wirelessly chargeable device being charged thereby, particularly without the need for data communication between a device or system that makes the determination of the charging status and a) the wireless charger or b) the wirelessly chargeable device.

BACKGROUND

Wireless charging involves wirelessly transmitting electrical power from a wireless charger to a wirelessly chargeable device. Wireless charging protocols include provisions for data transmission, separate from the power transmission, between the wireless charger and the wirelessly chargeable device. This data transmission can be used for communicating information to and/or from the charger and the device, including communicating parameters that allow the wireless charger to adjust its charging status.

When wireless chargers are integrated into more complex systems, they may be configured to provide charging status information to one or more subsystems of such a system, e.g., a host controller, that allows the system to obtain, via data communication with the wireless charger, data regarding the wirelessly chargeable device's charge status. For clarity, "data communication" as the term is used herein, refers to the communication of data via a predetermined data transmission protocol, e.g., a structured signal format that conforms to a recognized data transmission format, such as a binary data stream. In scenarios where the wireless charger is integrated into an assembly, a system, or a network, any communication between the wireless charger and the wirelessly chargeable device that results in a data communication between the wireless charger and, for example, a controller of such an assembly, system, etc., can pose risks of unintended access to the system beyond the wireless charger. For example, in a gaming environment, regulations often dictate that any data connection between a wagering machine and external devices is heavily restricted to avoid fraudulent or deceptive conduct. As another example, in an intelligent transport environment, malicious actors may exploit vulnerabilities of a vehicular system to take control of a vehicle. External communication from the charger to the system in such scenarios is therefore often prevented to avoid compromising the security of the system that contains the charger. However, a lack of such external communication removes the ability of the system to determine the charging status of the wireless charger and the charge status of the wirelessly chargeable device from the charger based on the provisions in the wireless charging protocol. An improvement or alternative to existing charging status determination is therefore desirable.

SUMMARY

According to a first aspect of the present disclosure, there is provided a method of determining a charging status of a wireless charger that is charging a wirelessly chargeable device, the method including the steps of:
  a. obtaining a measure of electrical power supplied to the wireless charger, the supplied power including transmitted power to the wirelessly chargeable device and non-transmitted power to the wireless charger;
  b. comparing the measure with one or more thresholds;
  c. based on the comparison, determining the charging status.

According to a second aspect of the present disclosure, there is provided a system for determining a charging status of a wireless charger that is charging a wirelessly chargeable device, the system including:
  a. sensing circuitry for obtaining a measure of electrical power supplied to the wireless charger, the supplied power including transmitted power to the wirelessly chargeable device and non-transmitted power to the wireless charger;
  b. decision circuitry for: (i) comparing the measure with one or more thresholds, and (ii) based on the comparison, determining the charging status.

BRIEF DESCRIPTION OF ACCOMPANYING DRAWINGS

Figure 4A:
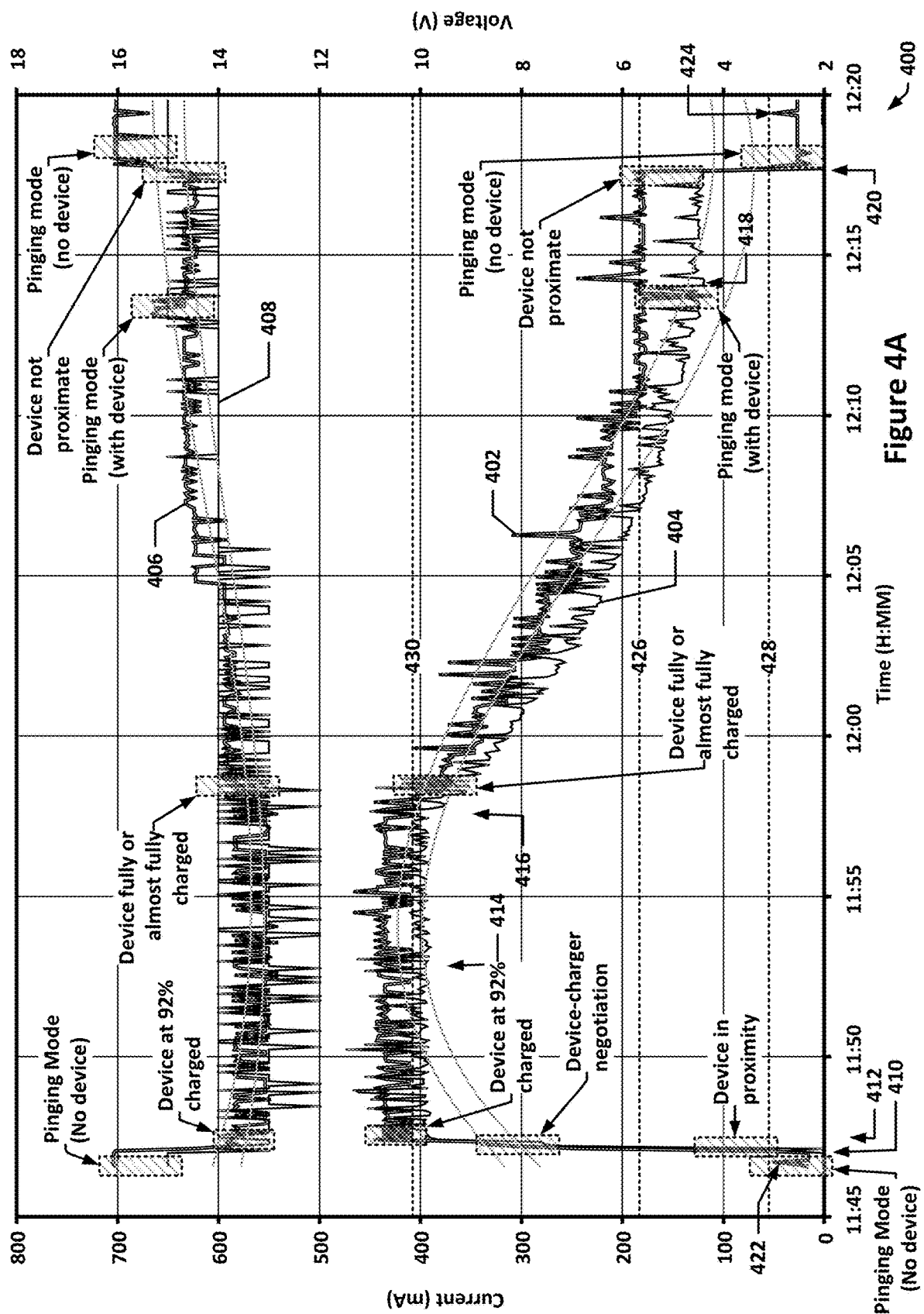
Figure 4B:
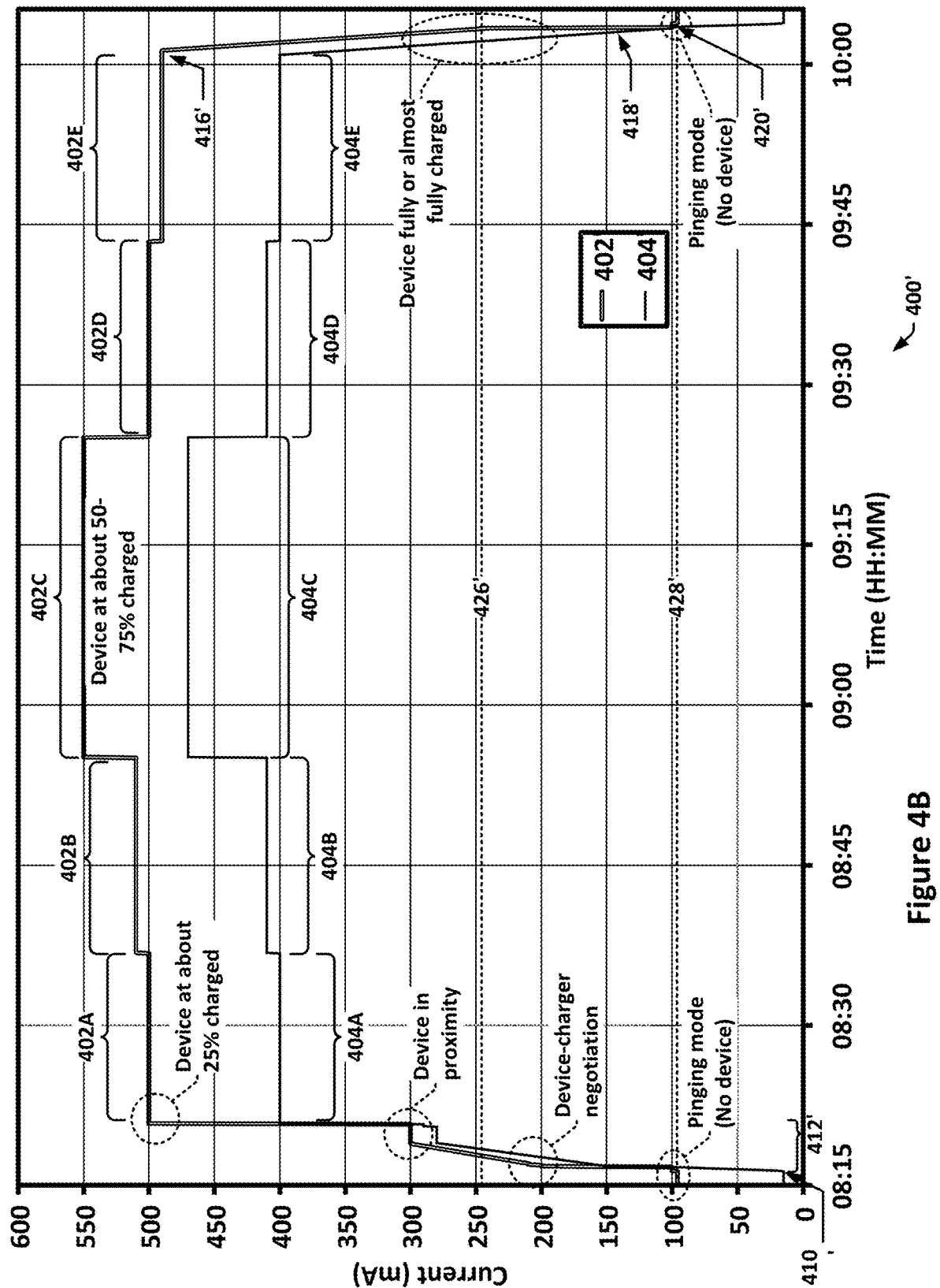

FIGS. 4A and 4B each illustrate a portion of the charging process, including one or more of the supplied current, the coil current, the supplied voltage and the coil voltage over time.

Figure 3A:
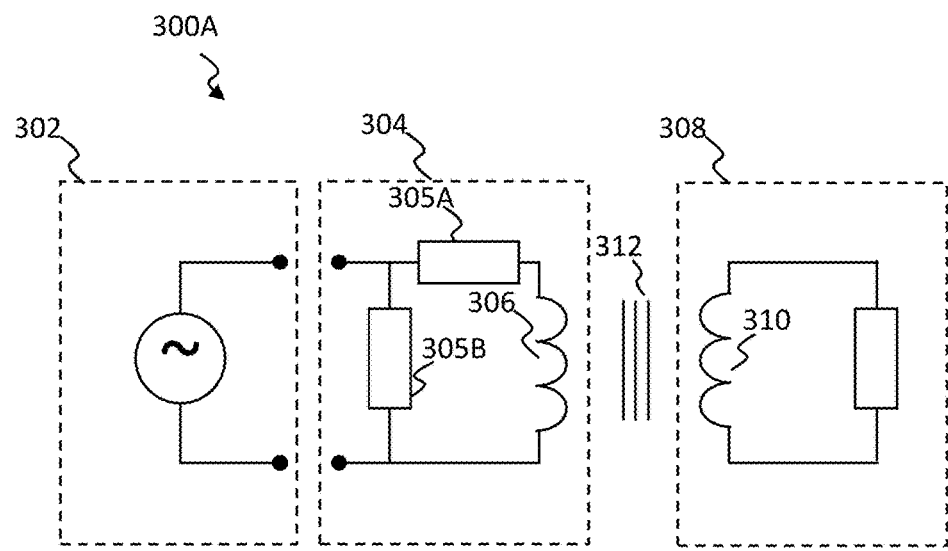
FIG. 3A illustrates a schematic of a wireless charging set-up.
Figure 3B:
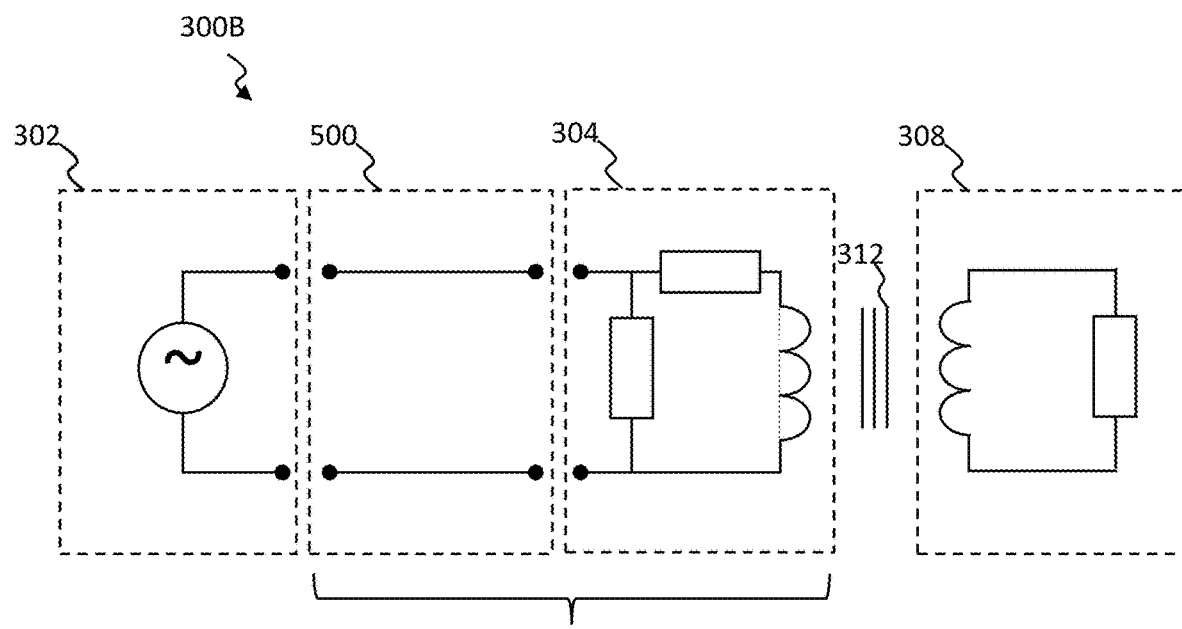
FIG. 3B illustrates a system to accompany the set-up of FIG. 1A for determining the charging status of a wireless charger performing wireless charging operations.
Figure 5A:
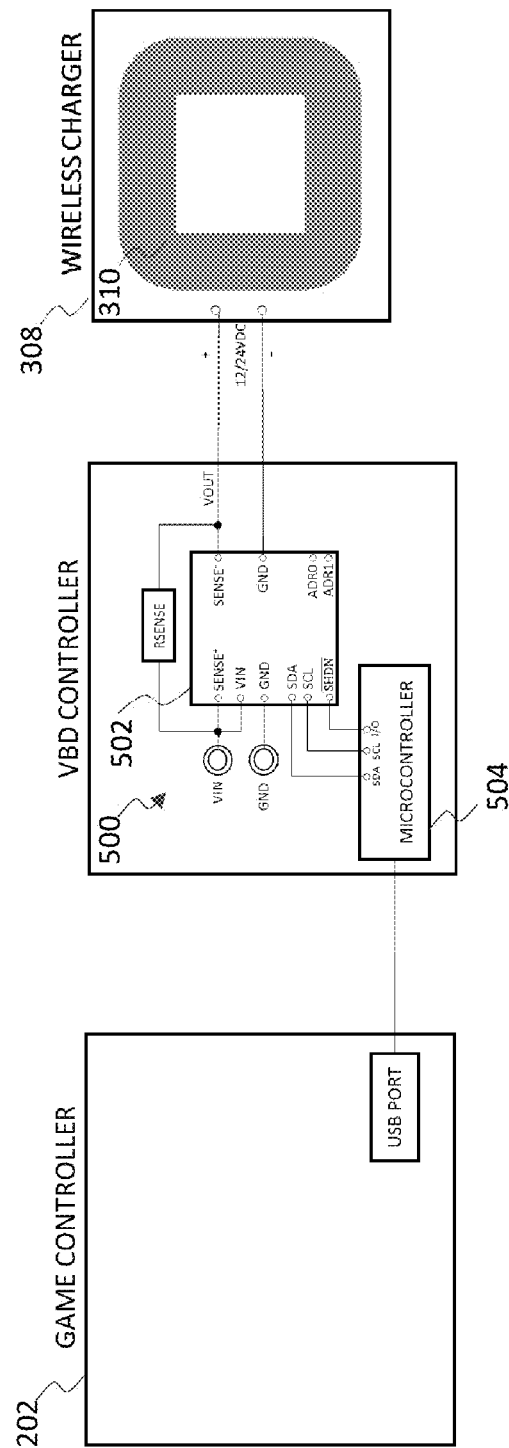

FIG. 5A illustrates an example block diagram of the system of FIG. 3B.

Figure 5B:
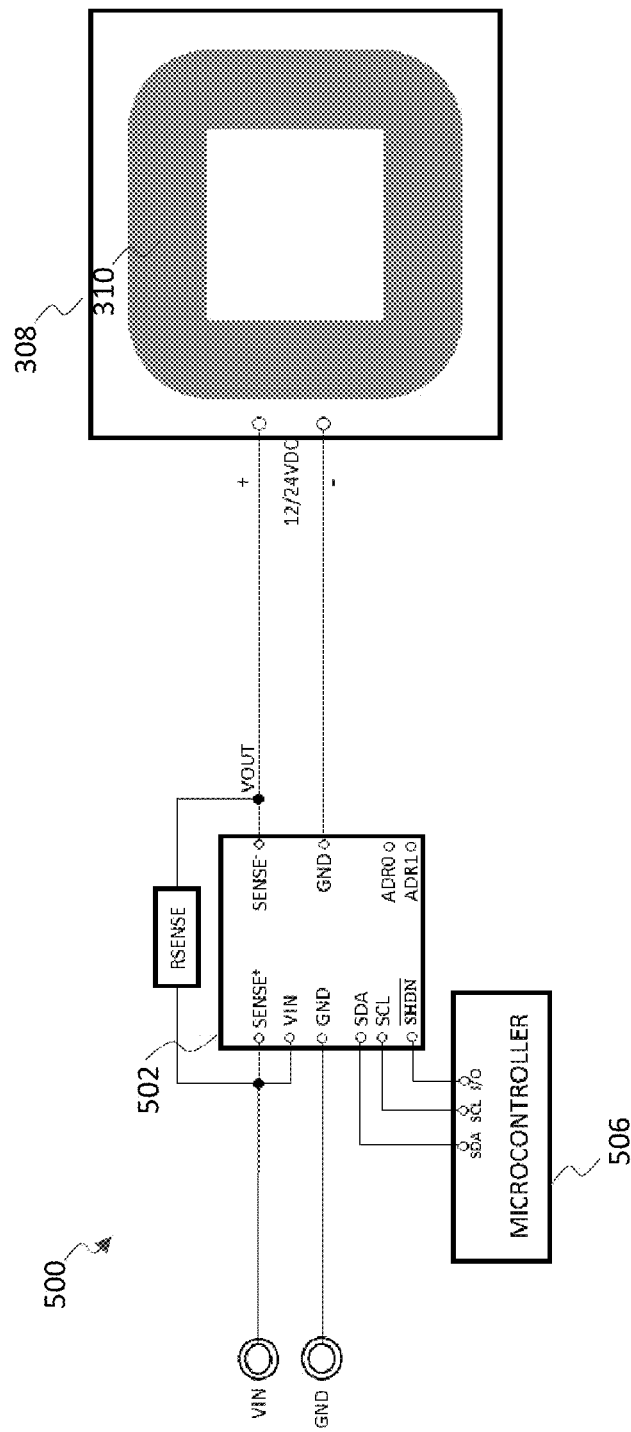

FIG. 5B illustrates another example block diagram of the system of FIG. 3B.

Figure 6:
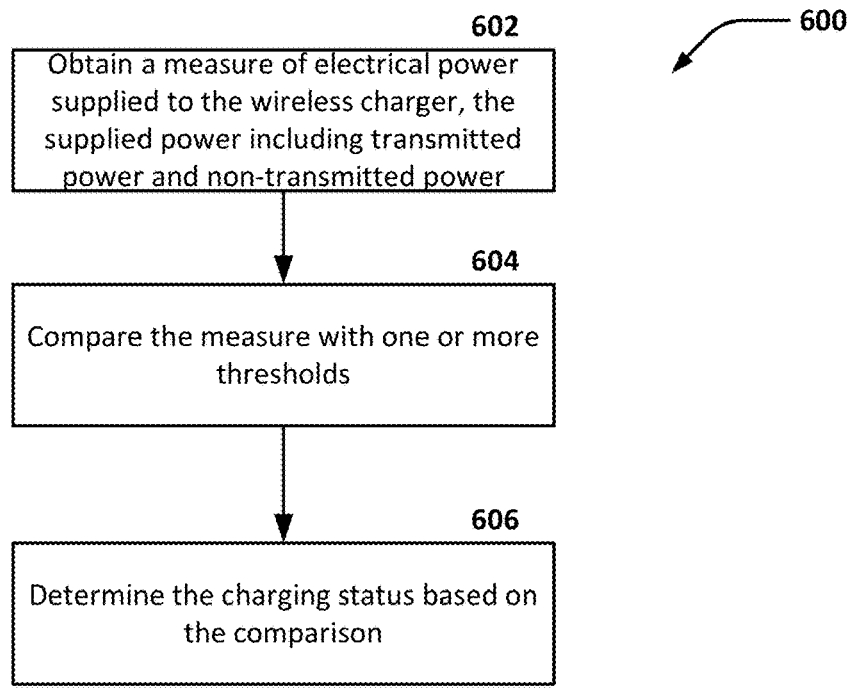

FIG. 6 illustrates a method of determining the charging status of a wireless charger performing wireless charging operations.

Figure 7:
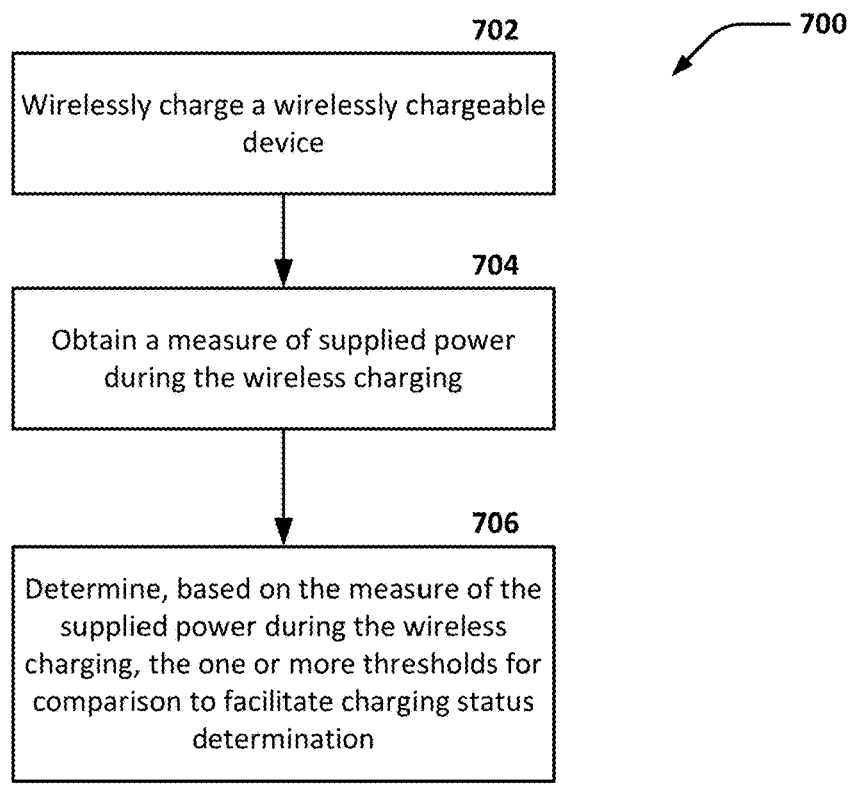

FIG. 7 illustrates a method of calibrating one or more thresholds for determining the charging status of a wireless charger performing wireless charging operations.

DETAILED DESCRIPTION OF EMBODIMENTS

Disclosed herein are a system and method of determining the status of wireless charging. The described system and corresponding method electrically probe a wireless charger locally for the determination of the charging status of the wireless charger. The determination is based on electrical measurements of the power supplied to the charger, hence no data communication from the wireless charging status determination system to/from the wireless charger is necessary for the charging status determination. Arrangements are configured to obtain a measure of the electrical power supplied to the wireless charging module (hereinafter "supplied power" for simplicity). The supplied power provides electrical power to the wireless charger for power transmission to the wirelessly chargeable device, as well as for operating the circuitry of the wireless charger. In one example, the measure of the supplied power is based on a measure of supplied current. These arrangements are further configured to compare the measure of the supplied power with one or more thresholds, and based on that comparison, determine the charging status. The charging status may include one or more indications of connectivity (e.g. charging engaged or charging disengaged), charging progress (e.g. charging in progress, or charging complete) and battery level within a wirelessly chargeable device being charged by the wireless charger (e.g. not fully charged, almost fully charged, or fully charged). The determined charging status may be used to generate information relating to, or derived from, the charging status that may be displayed on electronic gaming machines, autonomous or semi-autonomous vehicles, or apparatuses that offer wireless charging facility but require disablement of data communication to/from the wireless charger to the remainder of the system.

In the course of developing the wireless charging status determination systems discussed herein, it was determined that, while the power consumed by the power-transmitting inductive coil at the wireless charger (hereinafter "coil power" for simplicity) is indicative of the power received by the power-receiving inductive coil at the wirelessly chargeable device, the supplied power is at least but still indicative of the coil power. In other words, the supplied power was determined to be a good proxy of the received power. Based on this observation, various arrangements were devised in accord with the present disclosure for determining charging status based on a measure of the supplied power provided to the wireless charger. The determination of charging status of the wireless charger takes place without the need for "pairing" or other data communication to/from the wirelessly chargeable device or the wireless charger by the wireless charging status determination system. This lack of data communication reduces security risks and allows the wireless charging status determination system to be used as a trusted device that may be permitted to engage in data communication with devices, e.g., gaming controllers, that may be required to be kept isolated from potential data communication with a wirelessly chargeable device and/or wireless charger. Further, reliance on a measure of the supplied power to the wireless charger, rather than a measure of the coil power which is internal to the wireless charger, allows the present disclosure to be applicable without regards to the internal configuration of the wireless charger.

It will be understood that the wireless charger itself may still engage in data communication with the wirelessly chargeable device. For example, it is common for wireless chargers to engage in short-range wireless communications with wirelessly chargeable devices, e.g., to detect that such a device is in close proximity, to obtain information on the battery status and charging needs of such a device, and to tailor the amount of power delivered to the wirelessly chargeable device over time. The wireless charging determination system discussed herein that utilizes supplied power measurements to determine charging status does so without reference to such data communications (or data communications from the charger of any type, for that matter). Instead, the wireless charging determination system determines the amount of power supplied to the wireless charger and is, using various rules, able to make inferences or determinations of what mode or charging status the wireless charger is in, which, in turn, provides insight as to the charge status of the wirelessly chargeable device.

General Arrangements

The present disclosure describes arrangements of wireless charging in the context of electronic gaming machines (EGMs), for example in the context of Class 3 EGMs. However, a skilled person in the art would appreciate that the present disclosure is also applicable, with minor modifications, to non-gaming contexts, such as arrangements of wireless charging in an assembly, a system or a network, such as a vehicular system.

Figure 1:
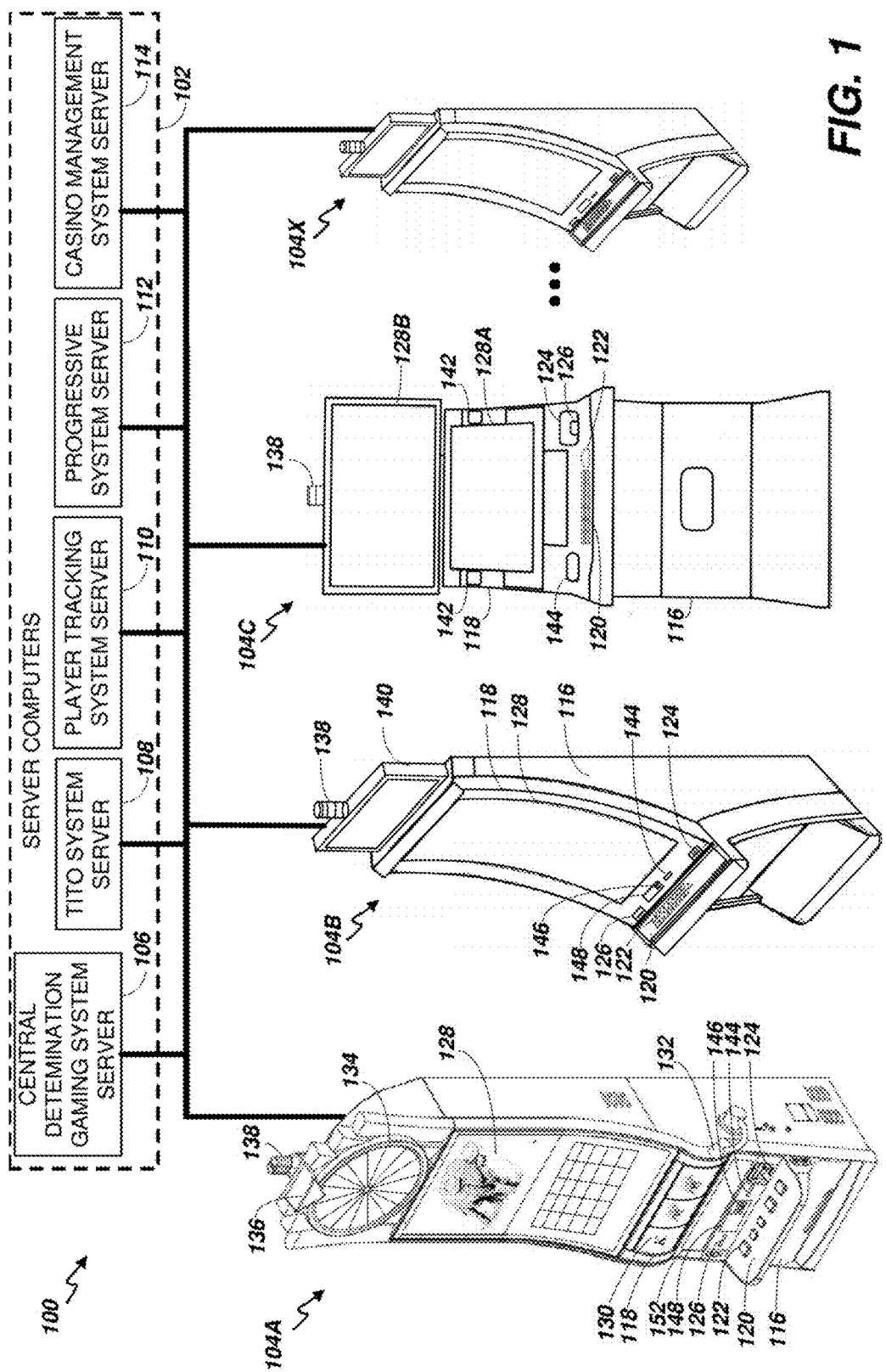
FIG. 1 is a schematic block diagram of functional components of a gaming system in accordance with an embodiment of the present disclosure.

FIG. 1 illustrates several different models of EGMs which may be networked to various gaming related servers. The present disclosure can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present disclosure may, in one or more embodiments, be practiced on a stand-alone gaming device such as gaming device 104A, gaming device 104B or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 116 which provides access to the interior of the cabinet. Gaming device 104A typically includes a button area or button deck 120 accessible by a player that is configured with input switches or buttons 122, an access channel for a bill validator 124, and/or an access channel for a ticket printer 126. In some arrangements, the button area or button deck 120 may take the form of a virtual button deck (VBD) controlled by a VBD controller. The VBD includes a glass top with touch-sensitive regions, such as capacitive or resistive touch sensitive regions. Each touch-sensitive region may be configured to be monitored by the VBD controller to receive touches corresponding traditional button presses. The wireless charger module 239 in accordance with the present disclosure may be located integrally with the VBD. For example, the wireless charger module may be located underneath the glass top. The wireless charger module includes an inductive coil near or adjacent the underside of the glass top for power transmission to a nearby wirelessly chargeable device, such as that placed on top of the glass top.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. In some embodiments a ticket reader can be used which is only capable of reading tickets. In some embodiments, a different form of token can be used to store a cash value, such as a magnetic stripe card.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking server system 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
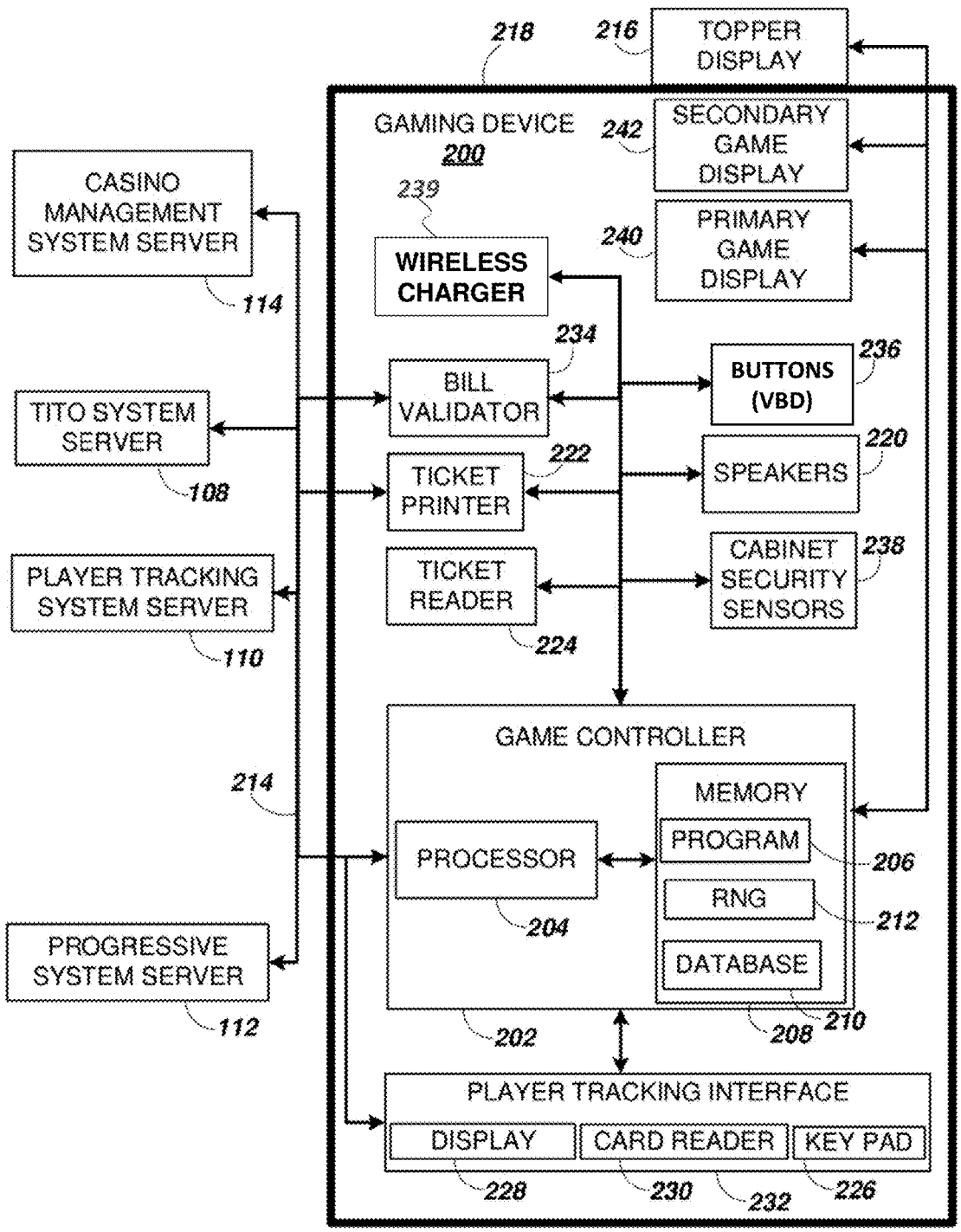
FIG. 2 is a diagrammatic representation of a gaming system in accordance with an embodiment of the present disclosure with the gaming system implemented using a portable computing device.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 118 which opens to provide access to the interior of the gaming device 104B. The main or service door 118 is typically used by service personnel to refill the ticket-out printer 126 and collect bills and tickets inserted into the bill validator 124. The door 118 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video blackjack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance. In some embodiments, the random number generator 212 is a pseudo-random number generator.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a wireless charger module 239, a primary game display 240, and a secondary game display 242, each coupled to and operable under the control of game controller 202. The wireless charger module 239 may be indirectly in communication with the game controller 202, e.g., via the wireless charging status determination system discussed herein. For example, where the buttons 236 are in the form of a VBD, the wireless charger module 239 may be in indirect communication with the game controller 202 via the VBD controller and the wireless charging status determination system discussed herein. Either or both of the primary game display 240 and the secondary game display 242 may be controlled by the game controller 202 to display the wireless charging status based on information received from the wireless charger module 239 by the game controller 202 via the wireless charging status determination system discussed herein. Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's Level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher (or another form of readable token) through an appropriate input device such as a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on the game displays 240, 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch-screen, or using some other input device which enables a player to input information into the gaming device 200. For example, controls may be provided on a touch-screen that allow a player to provide one or more wagering inputs for designating wager amounts to be placed on a wagering game. Similarly, controls may be provided on a touch-screen that allow a player to provide one or more credit inputs that, for example, may facilitate establishing a credit balance on the EGM for the purposes of making wagers during wagering game play.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance using an output device that can output at least one of physical currency and a token representing currency (typically by pressing a cash out button to receive a ticket from the ticket printer 222). The ticket may be "cashed-in" for money or inserted into another machine to establish a credit balance for play.

Further Details of the Disclosed Arrangement

FIG. 3A illustrates a schematic of a known wireless charging set-up 300A. The set-up 300A includes a power supply 302, a wireless charging module 304 (hereinafter "wireless charger 304" for simplicity), and a wirelessly chargeable device 308. The wireless charger 304 draws electrical power supplied by the power supply 302 and includes an inductive coil 306 for wireless power transmission. Correspondingly the wirelessly chargeable device 308, usually a portable device of a player, includes an inductive coil 310 for wireless power reception. In one arrangement, the power supply 302 provides DC power, typically providing power to an entire EGM, but for simplicity being shown here to supply power to the wireless charger 304 only. The DC power may be transformed from an AC mains power supply. As a skilled person would appreciate, the wireless charger 304 may transform the DC power into AC power at a desired resonant frequency to power the transmitting inductive coil 306. The supplied power is used by the transmitting inductive coil 306 as well as other components of the wireless charger 304. These other components are collectively represented by a serial resistive and/or reactive element 305A and a parallel resistive and/or reactive element 305B. As a skilled person would appreciate, wireless power transfer is facilitated by inductive coupling 312 formed between the inductive coils 306 and 310.

FIG. 3B illustrates a schematic of a wireless charging set-up 300B in accordance with the present disclosure. The set-up 300B adds a probing system 500 to the set-up 300A of FIG. 3A for determining the charging status of a wireless charger performing wireless charging. In the illustrated arrangement, the probing system 500 is a four-port device, with two ports electrically coupled with the power supply 302 and the other two ports electrically coupled with the wireless charger 304. The probing system 500, which may also be referred to herein as the wireless charging status determination system, together with the wireless charger 304 may be implemented as the wireless charging module 239, which as illustrated in FIG. 2 is in communication with the game controller 202 (directly, or indirectly via the VBD controller). Possible charging statuses and their determination are described further below. Once determined, the charging status can be communicated from the probing system 500 to the game controller 202, which in turn controls the display system, such as the primary game display 240 and/or the secondary game display 242, to display the determined charging status. This may be done without data communication between the probing system 500/wireless charging status determination system and a) the wireless charger 304 or b) the wirelessly chargeable device 308.

As mentioned, during development of the wireless charging determinations systems discussed herein, it was determined that the supplied power, while not identical to the transmitting-coil power, was nonetheless indicative of the transmitting-coil power and was thus a good proxy of the power received by the wirelessly chargeable device, as further exemplified and described in relation to FIG. 4A. More generally, FIG. 6 illustrates a method 600 of determining the charging status of a wireless charger performing wireless charging. The method 600 includes the step 602 of obtaining a measure of electrical power supplied to the wireless charger, the supplied power including transmitted power and non-transmitted power, the step 604 of comparing the measure with one or more thresholds, and the step 606 of determining the charging status based on the comparison.

In certain embodiments, determination of wireless charging status is based on a measure of power supplied to the wireless charger. The determination of the wireless charging status is based on a comparison of the measure of supplied power with one or more thresholds. In a first arrangement, a measure of the supplied power $P_s$ is provided by the product of a measure of supplied current $I_s$ and a measure of supplied voltage $V_s$ to the wireless charger. In this arrangement, the threshold(s) for comparison is in units of power. In a second arrangement, by assuming or recognizing that the supplied voltage $V_s$ is approximately constant, a measure of the supplied power $P_s$ is approximately provided by a measure of the supplied current $I_s$. Where the supplied voltage $V_s$ is taken to be constant, the supplied power $P_s$ is directly proportional to the supplied current $I_s$. In this arrangement, the threshold(s) for comparison may be in units of current or, if the supplied current is converted to corresponding supplied power, in units of power.

FIG. 4A illustrates a portion 400 of the wireless charging process, represented by the supplied current $I_s$ 402, the transmitting-coil current $I_c$ 404, the supplied voltage $V_s$ 406 and the transmitting-coil voltage $V_c$ 408 over time. At the start 410 of the charging process, the wirelessly chargeable device 308 is brought in proximity to the wireless charger 304. The proximity causes inductive coupling between the wireless charger 304 and the wirelessly chargeable device 308, which in turn causes abrupt changes 412 to $I_s$, $I_c$, $V_s$ and $V_c$. The supplied current $I_s$ 402 and the coil current $I_c$ 404 both rise relatively rapidly from zero or near-zero to an upper steady-state current $I_{USS}$ 430 at about 400 mA. The supplied voltage 406 and the coil voltage 408 both drop from a higher level at around 15 V and around 16 V, respectively, to a lower level at around 13 V and 14 V, respectively. The currents 402 and 404 (and similarly voltages 406 and 408) remain at their respective upper steady-state for a period of time. The leveling 414 indicates that charging of a non-fully charged device 308 is in progress. The currents 402, 404 and voltages 406, 408 then start to gradually drop 416 towards (but do not reach) their respective original levels. The start of the gradual drops 416 indicates a fully or almost fully charged device 308. During the gradual drop 416, the device 308 may be being trickle-charged, before the currents 402, 404 and voltages 406, 408 each reach another period of steady state 418, for example with the supplied current 402 hovering at a lower steady-state current $I_{LSS}$ 426. The lower steady state 418 indicates that the wireless charging is in standby mode, or is providing minimal power transmission. The wirelessly chargeable device 308 is then removed from the proximity of the wireless charger 304, causing inductive decoupling which in turn causes another sudden change 420 in each of the coil and supplied currents and voltages back to their original levels.

Most evidently at the start and end of the partial charging progress (and less evidently during the charging in progress), a measure of the supplied current 402 exhibits multiple peaks or spikes (such as 422 and 424). At least some of the peaks or spikes are a result of power being used by the wireless charger 304 for "pinging" or otherwise searching for any nearby wirelessly chargeable devices. Current levels associated with these pinging peaks or spikes reach the pinging current $I_p$ 428 momentarily.

It is noted that the supplied current 402 is almost at all times above the coil current 404, at a small and almost constant gap of about 50 mA. Together with the nearly constant supplied and transmitting-coil voltages 406 and 408, the close agreement between the supplied current 402 and the coil current 404 over time means that a measure of the supplied current 402 is indicative of the transmitting-coil power, hence a good proxy of the receiving-coil power. The thresholds for comparison in step 604 to facilitate charging status determination in step 606 can therefore be calibrated by inspecting the supply current $I_s$ over at least a portion of a reference wireless charging process. The portion of the reference wireless charging process may include (i) a coupling and/or decoupling stage(s) for inductively coupling and/or decoupling between the wireless charger with a reference or calibration device that is wirelessly chargeable, and (ii) a charging stage for a wirelessly chargeable the reference or calibration device from a less than fully (or almost fully) charged state to a fully (or almost fully) charged state. For example, as illustrated in FIG. 7, a method 700 of calibration may include (a) the step 702 of wirelessly charging a reference or calibration wirelessly chargeable device, (b) the step 704 of obtaining a measure of supplied power during the wireless charging, and (c) the step 706 of determining, based on the measure of the supplied power during the wireless charging, the one or more thresholds for comparison to facilitate charging status determination. The calibration may be achieved by the supply current and/or voltage measurements in accordance with FIGS. 4A and 4B. For example, in one arrangement, the pinging current level 428 is determined as the sole comparison threshold, below which the charging status is calibrated to be "Disengaged" and above which the charging status is calibrated to be "Engaged". In another arrangement, the pinging current level 428 is determined as a first threshold below which the charging status is calibrated to be "Disengaged", and the lower steady-state current level 426 is determined as a second threshold above which the charging status is calibrated to be "Engaged". Since the transmitted power is specified and hence regulated by the relevant wireless charging protocol (e.g. Qi™ administered by the Wireless Power Consortium), and since wireless charger manufacturers produce each wireless charger model within manufacturing tolerances, calibration is only required for each wireless charger model. Calibration results are stored and expected to be applicable to all wireless chargers of the same model, without the need to further calibrate wireless chargers of an already calibrated model.

Once the one or more thresholds are calibrated, the charging status may be determined in accordance with the method of FIG. 6. In some arrangements, where the supplied current 402 is measured to be above (or at or above) the lower steady-state current $I_{LSS}$ 426, the charging status is determined to be "Engaged", and where the supplied current 402 is measured to be below (or at or below) the pinging current level $I_p$ 428, the charging status is determined to be "Disengaged". The charging status may be determined on a hysteresis basis, where if $I_s$ is between $I_p$ and $I_{LSS}$, the determined status is unchanged from a previous determined status. For example, if the supplied current 402 is initially measured to be above the lower steady-state current $I_{LSS}$ 426 such that the charging status is determined to be "Engaged", upon a subsequent measurement where the supplied current 402 is measured to drop below the lower steady-state current $I_{LSS}$ 426 but still above the pinging current level $I_p$ 428, then the charging status is determined to remain as "Engaged". In contrast, if the supplied current 402 is initially measured to be below the pinging current level $I_p$ 428 such that the charging status is determined to be "Disengaged", upon a subsequent measurement where the supplied current 402 is measured to rise above the pinging current level $I_p$ 428 but still below the lower steady-state current $I_{LSS}$ 426, then the charging status is determined to remain as "Disengaged". In some arrangements, where the supplied current 402 is measured to be above (or at or above) the current level Imax 430, which is above steady-state current level 426, the charging status is additionally determined to be "Charging in progress" (which may also be viewed as a charge status for the wirelessly chargeable device of "Not fully charged"). Alternatively, where the supplied current 402 is measured to be below (or at or below) the current level Imax 430, but above the steady-state current level 426, the charging status is additionally determined to be "Charging complete" (which may also be viewed as a charge status for the wirelessly chargeable device of "Fully charged"). The following table (Table 1) summarizes an example of the one or more comparison thresholds and the determination made on the charging status. A skilled person would appreciate that other example arrangements may include a subset of the comparison thresholds and corresponding comparisons summarized in Table 1.

| Supplied current $I_S$ compared with one of more thresholds | Determined wireless charging status | |
|---|---|---|
| $I_S < I_p$ | "Disengaged" | |
| $I_S \geq I_{LSS}$ ($I_S \geq I_{USS}$) | "Engaged" | "Charging In progress" (or, from a wireless charge status of a wirelessly chargeable device, "Not fully charged") |

-continued

| Supplied current $I_S$ compared with one of more thresholds | Determined wireless charging status |
|---|---|
| ($I_S < I_{USS}$) | "Charging complete" (or, from a wireless charge status of a wirelessly chargeable device, "Fully charged") |
| $I_P ≥ I_S > I_{LSS}$ | (Unchanged from previously determined status) |

In other arrangements, fewer thresholds may be used for comparison. For example, the supplied current $I_s$ is compared with $I_p$ and $I_{LSS}$ to determine between a "Disengaged" charging status and an "Engaged" charging status on the hysteresis basis, without comparison with $I_{USS}$ for determining the charging completion status. In another example, the supplied current $I_s$ is compared with a single threshold $I_{TH}$ to determine between a "Disengaged" charging status (e.g. if $I_s<I_{TH}$) and a "Engaged" charging status (e.g. if $I_s≥I_{TH}$). $I_{TH}$ may be calibrated to be between $I_p$ and $I_{LSS}$, such as halfway or approximately halfway between $I_p$ and $I_{LSS}$. In yet another example, the supplied current $I_s$ is compared with a single threshold $I_{LSS}$ to determine whether the charging status is "Engaged" (e.g. if $I_s≥I_{LSS}$) or not (e.g. if $I_s<I_{LSS}$). Once the one or more thresholds are calibrated, decision circuitry may be programmed or otherwise configured to compare the measure of the supplied power with one or more of the thresholds, and to determine the charging status. The decision circuitry may be included in the VBD controller (FIG. 5A) or in a separate processor 506 (e.g. a microcontroller) in the probing system 500 (FIG. 5B). A skilled person would appreciate that the decision circuitry may be implemented in a number of programmable or configurable devices or components, such as an application-specific integrated circuit (ASIC) or a field-programmable gate array (FPGA). In particular, it will be understood that some EGMs (or other devices) that feature wireless charging status determination systems may utilize one or more controllers that, collectively, may provide the various functionalities discussed herein. For example, some EGMs may have a single controller that may provide both charging status determination functionality as well as wagering game presentation functionality (and other related functionalities). In another example, an EGM may include two controllers, one that is dedicated to charging status determination, and one that is dedicated to providing for presentation (and play) of a wagering game; in this example, the two controllers may be communicatively connected such that charging status determinations from the first controller may be communicated to the second controller. In yet other implementations, the functionality for wagering game presentation and/or charging status determination may be distributed between multiple controllers, e.g., the presentation of a wagering game may be provided by multiple controllers acting together in a coordinated fashion.

While FIG. 4A illustrates a shorter portion 400 of the wireless charging process, where the wirelessly chargeable device 308 is charged during its almost fully charged status (e.g. at 90%+ charged), FIG. 4B illustrates a longer portion 400' of a similar wireless charging process, where the wirelessly chargeable device 308 is charged from not so fully charged (e.g. at 25% charged) to fully charged or almost fully charged (e.g. at 90%+ charged). Like references in FIGS. 4A and 4B are labelled with like reference numerals (e.g. followed by a "'" or a letter). Further, FIG. 4B illustrates the supplied current 402' and coil current 404' over time, without illustrating the corresponding voltages.

As with FIG. 4A, FIG. 4B illustrates that the supplied current $I_s$ 402' is a good proxy of the coil current $I_c$ 404'.

At the start 410' of the charging process 400', the wirelessly chargeable device 308 is brought in proximity to the wireless charger 304. The proximity causes inductive coupling between the wireless charger 304 and the wirelessly chargeable device 308, which in turn causes abrupt changes 412' to supplied current $I_s$ 402' and coil current $I_c$ 404'. The supplied current $I_s$ 402' and the coil current $I_e$ 404' both rise rapidly from, or from below, pinging levels to their respective upper steady-state currents at about $I_s$=500 mA and $I_c$=400 mA, respectively. During the charging process 400', the supplied current $I_s$ 402' and the coil current $I_c$ 404' remain at multiple upper steady-state current levels (e.g. 402A, 402B, 402C, 402D and 402E). For example, in a first period of the charging process 400', associated with charging from 25% to 50%, the supplied current 402' remains at about 500 mA to 510 mA (402A, 402B). In a second period, associated with charging from 50% to 75%, the supplied current 402' is raised to and remains at about 550 mA (402C). In a third period, associated with charging from 75% to 90%, the supplied current 402' is dropped to and remains at about 490 mA to 500 mA (402D and 402E). The multiple upper steady-state current levels 402A, 402B, 402C, 402D and 402E may be calibrated as additional thresholds to divide the "Engaged" status further into further sub-statuses, such as "0-25% charged", "25-50% charged", "50-75% charged" and "75-100% charged". In some arrangements, where the same or similar steady-state currents are calibrated as thresholds associated with different sub-statuses, a measure of the voltage may be additionally made to disambiguate these thresholds.

The leveling 402A, 402B, 402C, 402D and 402E indicates that charging of a non-fully charged device 308 is in progress. The currents 402' and 404' then start to gradually drop 416' towards (but do not reach) their respective original levels. The start of the gradual drops 416' indicates a fully or almost fully charged device 308. During the gradual drops 416', the device 308 may be being trickle-charged, before the currents 402' and 404' each reach a period of steady state 418', for example with the supplied current 402' hovering at a lower steady-state current $I_{LSS}$ 426'. The lower steady state 418' indicates that the wireless charging is in standby mode, or is providing minimal power transmission. The wirelessly chargeable device 308 is then removed from the proximity of the wireless charger 304, causing inductive decoupling which in turn causes another sudden change 420' in each of the coil and supplied currents back to their original levels.

The wireless charging status determination system or probing system 500 is configured to determine the charging status based on a measure of power supplied to the wireless charger 304. FIGS. 5A and 5B illustrate a simplified block diagram of two respective example arrangements of the wireless charging status determination system or probing system 500 of FIG. 3B. In FIG. 5A the wireless charging status determination system or probing system 500A is a part of the VBD controller, which is in communication with the game controller 202, whereas in FIG. 5B the wireless charging status determination system or probing system 500 is separate from the VBD controller. The wireless charging status determination system or probing system 500A includes sensing circuitry 502 (in this case, an assembly of programmable op-amps) for obtaining a measure of supplied power. In this example, the measure of supplied power $P_s$ is based on a measure of the supplied current $I_s$ via a sense resistor $R_{SENSE}$, where $P_s=I_s^2 \times R_{SENSE}$. The obtained measurements are provided to decision circuitry 504 (e.g. a microcontroller) for determining charging status in accordance with comparison with one or more thresholds, such as that summarized in Table 1; such charging status may then be communicated by the wireless charging status determination system to other devices, e.g., a gaming controller or other host device, via a data communications connection between the wireless charging status determination system and that host device. The terminals of the sensing circuitry 502 are as follows:

- VIN and GND are the terminals connected to the power supply 302, and may be referred to herein as a power input port.
- VOUT and GND are the terminals connected to the wireless charger 304, and may be referred to herein as a power supply port.
- SENSE+ and SENSE− are the positive and negative terminals of effectively an ammeter. In one circuit implementation, they are the inverting and non-inverting inputs of the instrumentation amplifier that is used to measure the voltage across a sense resistor ($R_{SENSE}$) of known value (e.g. 0.2 ohms). Once the voltage across the resistor is measured, the current through the resistor and hence drawn by the wireless charging module 304 is measured.
- ADR0 and ADR1 are the input terminals for setting the slave inter-integrated circuit (I2C) address of the op-amp so that the VBD Controller board would be able to communicate with it.
- SDA is an input/output terminal for serial data. It is the I2C data line for master and slave device to send and receive the serial data.
- SCL is an input terminal for the serial clock signal used to synchronize data transfer over the I2C bus.
- SHDN is the output terminal for switching ON and OFF the power to the wireless charger.

It will be appreciated that the example discussed above is but one example of a suitable wireless charging status determination system, and that other implementations may use different circuits or configurations of components to provide equivalent measurements; such other implementations are also considered to be within the scope of this disclosure.

It will be understood that EGMs or devices that incorporate wireless chargers and wireless charging status determination systems as discussed herein may be specially configured to utilize the charging status determinations provided by the wireless charging status determination system to provide enhanced functionality-beyond that normally provided by wireless charging systems.

For example, in some implementations, an EGM may be configured to obtain charging status from the wireless charging status determination system, as discussed herein, and present one or more notifications to a user regarding that charging status. For example, if the charging status indicates that the wireless charger is currently charging a wirelessly chargeable device, then the EGM may cause a message to be presented on a display of the EGM that states "Charging your device" or "Charging your phone." Similarly, if the charging status indicates that the wireless charger is no longer charging a wirelessly chargeable device (or is trickle charging it) but the wirelessly chargeable device is still interfaced with the charger, then the EGM may cause a message to be presented on a display of the EGM that states "Charging complete!," "Finished charging your device!," or "All topped off!," or the like. If the charging status indicates that no wirelessly chargeable device is currently proximate to the wireless charger, then the EGM may cause a message such as "Need a charge? Place your phone on the wireless charging zone to get some juice!," "Place phone on wireless charging zone to charge device," etc.

In some EGMs, charging status information from the wireless charging status determination system may be used to, for example, provide contextual assistance to users of such EGMs. For example, an EGM may be configured to check the charging status in response to receiving an indication that a player is likely to leave the EGM, and may, if the charging status indicates that a wirelessly chargeable device is present, generate one or more notifications that may be presented to the player (through on-screen display, through auditory feedback, or both).

For example, if a player selects an option on an EGM to cash out their credits, which is typically done when a player wishes to stop playing on that EGM, the EGM may check the charging status to determine if a wirelessly chargeable device is proximate to the charger (regardless of whether or not it is actually being charged). If the charging status indicates that a wirelessly chargeable device is proximate to the charger, then the EGM may cause a notification to be presented such as "Don't forget your phone!," "Check wireless charger for device!," or the like. In some implementations, such a notification may be presented to the player prior to the EGM actually performing the requested cash-out operation. In some further implementations, the EGM may even delay performance of the cash-out operation until the player has confirmed that they have retrieved their device. Such confirmation may be provided either implicitly (e.g., by the EGM detecting that the charging status of the wireless charger has changed to a state indicating that the wirelessly chargeable device is no longer in proximity to the wireless charger, which may indicate that the player has picked it up) or explicitly (e.g., by presenting an on-screen dialog or message asking the player if they have retrieved their device (e.g., "Did you remember to get your wirelessly charging device?"); the player would be required to select a button associated with such a message (and indicating that they have retrieved their device, e.g., a button that states "Yes, I've got it!") to cause the message to be dismissed and the cash-out operation to continue). This may reduce the chance that the player forgets their phone when they leave the EGM (this may be particularly likely in a casino environment, where the lighting may be dim; wireless charging stations on EGMs may also often have a black finish that may make it difficult to see the black rectangle of a phone (for phones that are of that appearance)). In some implementations, such EGMs may have additional indication systems that may be additionally or alternatively activated in such circumstances to draw the player's attention to the device that is proximate to the wireless charger. For example, there may be lights arranged around the wireless charging station that may be activated, e.g., flashed, pulsed, or lit, to draw the player's attention to the wireless charging station.

In some EGMs, charging status from the wireless charging status determination system may be used by the EGM to determine if a player should be provided with an opportunity to enable the wireless charger through input of credits, funds, player tracking account information, or other item. For example, an EGM may be configured to provide wireless charging functionality to wirelessly chargeable devices only under certain circumstances, such as when a player is actively playing a wagering game on the EGM, when a player is logged into the EGM using a player tracking account, when a player has transferred some amount of credits or currency to the EGM, when the player has logged in with a player tracking account associated with a particular threshold status, etc. Such selective enablement may allow the EGM to provide wireless charging functionality in one or more ways.

For example, in one scenario, if the wireless charging status determination system indicates that a wirelessly chargeable device is proximate to the charger, the EGM may cause the wireless charger to not charge the wirelessly chargeable device or to operate in a manner that drastically reduces the charging rate of the wirelessly chargeable device, e.g., by reducing the power supplied to the wireless charger or by cycling the power supplied to the wireless charger between on and off states, unless a particular condition or conditions are met. For example, in some implementations the EGM may cause a notification to be presented, e.g., on a display of the EGM, that indicates that a wirelessly chargeable device has been detected proximate to the wireless charger and that wireless charging is available for this wirelessly chargeable device under one or more conditions. Such conditions may include, for example, a) providing a specified amount of credit or currency to the EGM, b) engaging in wagering game play on the EGM (or establishing a credit balance for engaging in such wagering game play by providing one or more credit inputs), c) signing in to the EGM with a player tracking account, d) signing in to the EGM with a player tracking account of a particular reward or benefit level (which includes access to such wireless chargers), and so forth. In some implementations, such a notification may be presented in tandem with one or more user-selectable controls that allow the user to access, for example, an interface for providing the specified amount of credit or currency, log in with a player tracking account, or select a wagering game for play. Once the indicated requirements for providing wireless charging have been met, the EGM controller may cause the power supplied to the wireless charger to be restored to an operable level, at which point the wireless charger will power up and start charging the wirelessly chargeable device. In some implementations in which wagering game play is required to enable wireless charging functionality (or provide enhanced wireless charging system performance), such charging functionality may be provided for as long as the player is playing the wagering game.

Such implementations may help avoid or mitigate scenarios where a person sits at an EGM to use its wireless charging functionality but does not otherwise engage in revenue-generating behavior with the EGM.

In addition to the claimed implementations, the following additional implementations are also at least considered within the scope of this disclosure.

Implementation 1: A method of determining a charging status of charging a wirelessly chargeable device by a wireless charger, the method including the steps of: a) obtaining a measure of electrical power supplied to the wireless charger, the supplied power including transmitted power to the wirelessly chargeable device and non-transmitted power to the wireless charger; b) comparing the measure with one or more thresholds; and c) based on the comparison, determining the charging status.

Implementation 2: The method of implementation 1, wherein the measure of the electrical power supplied to the wireless charger is provided by a measure of electrical current supplied to the wireless charger.

Implementation 3: The method of implementation 1, wherein the measure of the electrical power supplied to the wireless charger is provided by the product of a measure of electrical current and a measure of electrical voltage supplied to the wireless charger.

Implementation 4: The method of implementation 1, wherein the one or more thresholds includes one or more of: an upper steady-state level; a lower steady-state level; and a pinging level.

Implementation 5: The method of implementation 4, wherein the upper steady-state level is representative of power supplied to the wireless charger while engaging a non-fully charged wirelessly chargeable device.

Implementation 6: The method of implementation 4 or 5, wherein the lower steady-state level is representative of power supplied to the wireless charger while engaging a fully charged or almost fully charged wirelessly chargeable device.

Implementation 7: The method of either of implementations 4 or 5, wherein the pinging level is representative of power supplied to the wireless charger while searching for a nearby wirelessly chargeable device.

Implementation 8: The method of any one of implementations 4 to 7, wherein the one or more thresholds are calibrated by measurements made during at least a portion of the wireless charging process.

Implementation 9: The method of any one of the preceding implementations, wherein the transmitted power includes power wirelessly transferred from the wireless charger to a wirelessly chargeable device.

Implementation 10: The method of implementation 9, wherein the wirelessly transmitted power includes power transmitted by one or more inductive coils of the wireless charger.

Implementation 11: The method of any one of the preceding implementations, wherein the non-transmitted power includes power for operating circuitry of the wireless charger.

Implementation 12: The method of any one of the preceding implementations, wherein the determination is not based on any data communication between the wireless charger and the wirelessly chargeable device.

Implementation 13: The method of any one of the preceding implementations, further including the step of displaying the determined wireless charging status.

Implementation 14: A system for determining a charging status of charging a wirelessly chargeable device by a wireless charger, the system including: a) sensing circuitry for obtaining a measure of electrical power supplied to the wireless charger, the supplied power including transmitted power to the wirelessly chargeable device and non-transmitted power to the wireless charger; and b) decision circuitry for: (i) comparing the measure with one or more thresholds, and (ii) based on the comparison, determining the charging status.

In the claims of this application and in the description of the invention, except where the context requires otherwise due to express language or necessary implication, the words "comprise" or variations such as "comprises" or "comprising" are used in an inclusive sense, i.e. to specify the presence of the stated features but not to preclude the presence or addition of further features in various embodiments of the invention. Modifications and variations as would be apparent to a skilled addressee are deemed to be within the scope of the present invention.

What is claimed is:

1. A wireless charging status determination system comprising:

a power input port, wherein the power input port is configured to be electrically connected with a power supply and to thereby receive electrical power therefrom; and a power supply port, wherein the power supply port is configured to be electrically connected with a wireless charger and to thereby provide electrical power obtained from the power input port thereto;

sensing circuitry configured to obtain measurements indicative of an amount of electrical power flowing from the power input port to the power supply port; and one or more controllers, the one or more controllers configured to:

obtain one or more measurements indicative of an amount of electrical power received by the wireless charging status determination system via the power input port and provided by the wireless charging status determination system via the power supply port, compare the one or more measurements against one or more thresholds, and determine, without data communication between the wireless charging status determination system and a) the wireless charger and b) a wirelessly chargeable device charged by the wireless charger and based on the comparisons of the one or more measurements against the one or more thresholds, a charging status of the wireless charger.

2. The wireless charging status determination system of claim 1, further comprising a gaming machine cabinet, wherein the power input port, the power supply port, the sensing circuitry, and the one or more controllers are located within the gaming machine cabinet.

3. The wireless charging status determination system of claim 1, wherein the one or more measurements are measurements of electrical current supplied to the power supply port.

4. The wireless charging status determination system of claim 1, wherein the one or more measurements are measurements of electrical current and electrical voltage supplied to the power supply port.

5. The wireless charging status determination system of claim 1, wherein the one or more thresholds include one or more of:

an upper steady-state level,
a lower steady-state level, and
a pinging level.

6. The wireless charging status determination system of claim 5, wherein the upper steady-state level is representative of power supplied to the wireless charger while charging a wirelessly chargeable device when the wirelessly chargeable device is not in a fully charged state.

7. The wireless charging status determination system of claim 5, wherein the lower steady-state level is representative of power supplied to the wireless charger while charging a wirelessly chargeable device when the wirelessly chargeable device is in a fully charged state or almost fully charged state.

8. The wireless charging status determination system of claim 5, wherein the pinging level is representative of power supplied to the wireless charger while the wireless charger is searching for a nearby wirelessly chargeable device.

9. One or more non-transitory, computer-readable media storing computer-executable instructions which, when executed by one or more processors of a wireless charging status determination system having a power input port that is configured to be electrically connected with a power supply and to thereby receive electrical power therefrom, a power supply port configured to be electrically connected with a wireless charger and to thereby provide electrical power obtained from the power input port thereto, and sensing circuitry configured to obtain measurements indicative of an amount of electrical power flowing from the power input port to the power supply port, cause the one or more processors to:

obtain one or more measurements indicative of an amount of electrical power received by the wireless charging status determination system via the power input port and provided by the wireless charging status determination system via the power supply port, compare the one or more measurements against one or more thresholds, and determine, without data communication between the wireless charging status determination system and a) the wireless charger and b) a wirelessly chargeable device charged by the wireless charger and based on the comparisons of the one or more measurements against the one or more thresholds, a charging status of the wireless charger.

10. The one or more non-transitory, computer-readable media of claim 9, wherein the one or more measurements are measurements of electrical current supplied to the power supply port.

11. The one or more non-transitory, computer-readable media of claim 9, wherein the one or more measurements are measurements of electrical current and electrical voltage supplied to the power supply port.

12. The one or more non-transitory, computer-readable media of claim 9, wherein the one or more thresholds include one or more of:

an upper steady-state level,
a lower steady-state level, and
a pinging level.

13. The one or more non-transitory, computer-readable media of claim 12, wherein the upper steady-state level is representative of power supplied to the wireless charger while charging a wirelessly chargeable device when the wirelessly chargeable device is not in a fully charged state.

14. The one or more non-transitory, computer-readable media of claim 12, wherein the lower steady-state level is representative of power supplied to the wireless charger while charging a wirelessly chargeable device when the wirelessly chargeable device is in a fully charged state or almost fully charged state.

15. The one or more non-transitory, computer-readable media of claim 12, wherein the pinging level is representative of power supplied to the wireless charger while the wireless charger is searching for a nearby wirelessly chargeable device.

16. A method of operating a wireless charging status determination system having:

a power input port, wherein the power input port is configured to be electrically connected with a power supply and to thereby receive electrical power therefrom;

a power supply port, wherein the power supply port is configured to be electrically connected with a wireless charger and to thereby provide electrical power obtained from the power input port thereto; and sensing circuitry configured to obtain measurements indicative of an amount of electrical power flowing from the power input port to the power supply port, the method comprising:

obtaining one or more measurements indicative of an amount of electrical power received by the wireless charging status determination system via a power input port of the wireless charging status determination system and then provided by the wireless charging status determination to a power supply port of the wireless charging status determination system, comparing the one or more measurements against one or more thresholds, and determining, without data communication between the wireless charging status determination system and a) the wireless charger and b) a wirelessly chargeable device charged by the wireless charger and based on the comparisons of the one or more measurements against the one or more thresholds, a charging status of a wireless charger connected with the power supply port.

17. The method of claim 16, wherein the one or more measurements are measurements of electrical current and electrical voltage supplied to the power supply port.

18. The method of claim 16, wherein the one or more measurements are measurements of electrical current supplied to the power supply port.

19. The method of claim 16, wherein the one or more thresholds include one or more of:
   an upper steady-state level,
   a lower steady-state level, and
   a pinging level.

20. The method of claim 19, wherein the upper steady-state level is representative of power supplied to the wireless charger while charging a wirelessly chargeable device when the wirelessly chargeable device is not in a fully charged state.

* * * * *